US012674928B2

(12) United States Patent
Hu et al.

(10) Patent No.: US 12,674,928 B2
(45) Date of Patent: Jul. 7, 2026

(54) BACKLIT FINGER FEATURE RECOGNITION STRUCTURE

(71) Applicant: Darfon Electronics Corp., Taoyuan City (TW)

(72) Inventors: Tsai-Jung Hu, Taoyuan City (TW); Chun-Tan Wu, Taoyuan City (TW)

(73) Assignee: DARFON ELECTRONICS CORP., Taoyuan City (TW)

( * ) Notice: Subject to any disclaimer, the term of this patent is extended or adjusted under 35 U.S.C. 154(b) by 0 days.

(21) Appl. No.: 19/058,169

(22) Filed: Feb. 20, 2025

(65) Prior Publication Data

US 2025/0264656 A1      Aug. 21, 2025

Related U.S. Application Data

(60) Provisional application No. 63/658,535, filed on Jun. 11, 2024, provisional application No. 63/645,229, filed on May 10, 2024, provisional application No. 63/555,921, filed on Feb. 21, 2024.

(30) Foreign Application Priority Data

Feb. 18, 2025 (TW) ................................. 114201636

(51) Int. Cl.
*G06V 40/13* (2022.01)
*F21V 8/00* (2006.01)
*G06V 10/145* (2022.01)

(52) U.S. Cl.
CPC ......... *G02B 6/0088* (2013.01); *G02B 6/0066* (2013.01); *G06V 10/145* (2022.01); *G06V 40/1318* (2022.01)

(58) Field of Classification Search
CPC ..... G02B 6/0066; G02B 6/0088; G06V 40/13
See application file for complete search history.

(56) References Cited

U.S. PATENT DOCUMENTS

| | | | |
|---|---|---|---|
| 7,200,288 B2 | 4/2007 | Ogura | |
| 8,903,140 B2 | 12/2014 | Wu | |
| 9,824,253 B2 | 11/2017 | Lin | |
| 10,372,964 B2 | 8/2019 | Lu | |
| 10,803,287 B2 | 10/2020 | Wu | |
| 11,875,591 B2 | 1/2024 | Lee | |
| 2019/0294847 A1* | 9/2019 | Chang .................. | G02B 6/0018 |

(Continued)

FOREIGN PATENT DOCUMENTS

| | | | |
|---|---|---|---|
| CN | 1424693 B | 4/2010 | |
| CN | 204613976 U | 9/2015 | |

(Continued)

*Primary Examiner* — Joseph R Haley
(74) *Attorney, Agent, or Firm* — McClure, Qualey & Rodack, LLP

(57) ABSTRACT

A backlit finger feature recognition structure includes a feature sensor configured to sense a finger feature, a light guide member disposed surrounding the finger sensor, a circuit board assembly disposed corresponding to the light guide member and electrically connected to a lower side of the feature sensor, and an illuminant electrically connected to the circuit board assembly, wherein in a stacking direction, the illuminant does not overlap the feature sensor, and the light guide member guides light emitted from the illuminant to be emitted along the stacking direction.

20 Claims, 13 Drawing Sheets

(56)  References Cited

U.S. PATENT DOCUMENTS

| | | | |
|---|---|---|---|
| 2020/0117877 A1* | 4/2020 | Xie ........................ | G02B 5/208 |
| 2023/0176412 A1* | 6/2023 | Zhou .................. | G06V 40/1365 |
| | | | 349/12 |

FOREIGN PATENT DOCUMENTS

| | | | |
|---|---|---|---|
| CN | 204631898 U | 9/2015 | |
| CN | 207764818 U | 8/2018 | |
| CN | 207924694 U | 9/2018 | |
| CN | 109711235 B | 5/2019 | |
| CN | 211788758 U | 10/2020 | |
| CN | 213958070 U | 8/2021 | |
| CN | 214384658 U | 10/2021 | |
| CN | 214751915 U | 11/2021 | |
| CN | 218273432 U | 1/2023 | |
| CN | 218413520 U | 1/2023 | |
| CN | 218730543 U | 3/2023 | |
| JP | 2011180973 A | 9/2011 | |
| JP | 6055038 B1 | 12/2016 | |
| JP | 6026606 B1 | 3/2017 | |
| TW | I382349 B | 7/2010 | |
| TW | M544048 U | 6/2017 | |
| TW | I649696 B | 7/2018 | |
| TW | M621518 U | 12/2021 | |
| TW | M632311 U | 9/2022 | |
| TW | 202336636 A | 9/2023 | |
| TW | I834174 B | 3/2024 | |

* cited by examiner

BACKLIT FINGER FEATURE RECOGNITION STRUCTURE

CROSS-REFERENCE TO RELATED APPLICATION

This application claims the priority benefits of Taiwan patent application serial No. 114201636, filed on Feb. 18, 2025, and also claims the priority benefits of U.S. provisional application Ser. No. 63/555,921, filed Feb. 21, 2024, U.S. provisional application Ser. No. 63/645,229, filed May 10, 2024, and U.S. provisional application Ser. No. 63/658, 535, filed Jun. 11, 2024. The entirety of the mentioned above patent applications is hereby incorporated by reference herein and made a part of this specification.

BACKGROUND OF THE INVENTION

1. Field of the Invention

The invention generally relates to a feature recognition structure. Particularly, the invention relates to a thinned type of backlit finger feature recognition structure.

2. Description of the Prior Art

Conventional backlit fingerprint recognition modules are usually connected to the system by means of a flexible printed circuit board (FPC). However, the outbound end of the FPC may block the light path. To address this problem, the rigid circuit board is divided into multiple pieces of circuit boards, which are respectively arranged in different areas of the FPC, and the multiple pieces of circuit boards are stacked on each other by bending or folding the FPC. However, the stacking of multiple pieces of circuit boards makes it difficult to smoothly reduce the thickness of the module, which is not conducive to the thinning design. Furthermore, due to the size limitation of the module itself, the bending (or folding) radius of the FPC is usually small, which easily causes damage to components or circuits, thereby causing reliability problems.

SUMMARY OF THE INVENTION

It is an object of the invention to provide a backlit finger feature recognition structure, which effectively reduces the overall thickness by not overlapping at least one illuminant with the feature sensor in the stacking direction.

It is another object of the invention to provide a backlit finger feature recognition structure, wherein the feature sensor is cut according to a specific design to form the retreat space for the illuminant and promote the space utilization without affecting the connection pad and the sensing function.

It is yet another object of the invention to provide a backlit finger feature recognition structure, wherein the light guide member is formed by one or more flat plates, facilitating the processability and manufacturability.

In an embodiment, the invention provides a backlit finger feature recognition structure, including a feature sensor configured to sense a finger feature, a light guide member disposed surrounding the feature sensor, a circuit board assembly disposed corresponding to the light guide member and electrically connected to a lower side of the feature sensor, and an illuminant electrically connected to the circuit board assembly, wherein in a stacking direction, the illuminant does not overlap the feature sensor, and the light guide member guides light emitted from the illuminant to be emitted along the stacking direction.

In another embodiment, the invention provides a backlit finger feature recognition structure, including a feature sensor configured to sense a finger feature, a light guide member disposed surrounding the feature sensor, a circuit board assembly disposed corresponding to the light guide member and electrically connected to a lower side of the feature sensor, and an illuminant electrically connected to the circuit board assembly, wherein in a plane view, the illuminant is located between the light guide member and the feature sensor, and the light guide member guides light emitted from the illuminant to be emitted upward.

In an embodiment, the feature sensor has a non-quadrilateral cut shape to form a retreat space between the light guide member and the feature sensor, and the illuminant is located in the retreat space.

In an embodiment, the illuminant and the feature sensor are located at a same side of the circuit board assembly.

In an embodiment, the light guide member includes a plate body with an opening. The plate body is disposed on the circuit board assembly. The feature sensor and the illuminant are accommodated in the opening.

In an embodiment, the opening includes a first receiving slot and a second receiving slot. The first receiving slot is configured to accommodate the feature sensor. The second receiving slot extends from the first receiving slot and is configured to accommodate the illuminant.

In an embodiment, the light guide member is constituted by a plurality of detachable plate bodies.

In an embodiment, the light guide member includes a first plate body and a second plate body respectively located under and above the circuit board assembly. The first plate body and the second plate body respectively have a first opening and a second opening. The first opening allows a portion of the circuit board assembly to extend therethrough to outside of the light guide member. The feature sensor and the illuminant are accommodated in the second opening.

In an embodiment, the first plate body and the second plate body constitute the light guide member of an integral structure or a detachable structure.

In an embodiment, the backlit finger feature recognition structure further includes an additional illuminant electrically connected to the circuit board assembly, wherein the additional illuminant and the illuminant are located at a same surface or different surfaces of the circuit board assembly.

In an embodiment, the circuit board assembly is a flex-rigid composite circuit board including a flexible printed circuit board and at least one rigid circuit board. The feature sensor and the illuminant are disposed on and electrically connected to the at least one rigid circuit board.

In an embodiment, the backlit finger feature recognition structure further includes a base holder with an accommodation space and a slot. The accommodation space is configured to accommodate the feature sensor, the light guide member, the circuit board assembly, and the illuminant. The slot communicates with the accommodation space and allows the circuit board assembly to extend from the slot to outside of the base holder.

In an embodiment, the backlit finger feature recognition structure further includes a cover disposed on the base holder to cover the accommodation space. The cover has a light-permeable portion. In a light-output direction, the light guide member at least partially overlaps the light-permeable portion.

In an embodiment, the backlit finger feature recognition structure further includes an optical film disposed on a light-exit surface of the light guide member.

In an embodiment, the backlit finger feature recognition structure further includes a plurality of light-exit dots disposed at a side of the light guide member opposite to a light-exit surface of the light guide member.

In an embodiment, the illuminant is at least partially located in a region defined by extending lines of adjacent outmost sides of the feature sensor.

Compared with the prior art, the backlit finger feature recognition structure of the invention forms the retreat space between the light guide member and the feature sensor by the cutting design of the feature sensor to improve the space utilization, effectively reduce the overall thickness, and facilitate the thinning design without affecting the sensing function and electrical connection of the feature sensor. Moreover, the backlit finger feature recognition structure of the invention has the light guide member formed by one or more flat plates, facilitating the processability and manufacturability of the light guide member.

DETAILED DESCRIPTION OF THE PREFERRED EMBODIMENT

The invention is related to a finger feature recognition structure, particularly to a thinned type of backlit finger feature recognition structure. The backlit finger feature recognition structure of the invention can be disposed on the keyboard or housing of an electronic device in a modular configuration, but not limited thereto. According to practical applications, the backlit finger feature recognition structure of the invention can be an independent feature recognition device, which is configured to provide the recognition result for further operations of other electronic devices.

Figure 1:
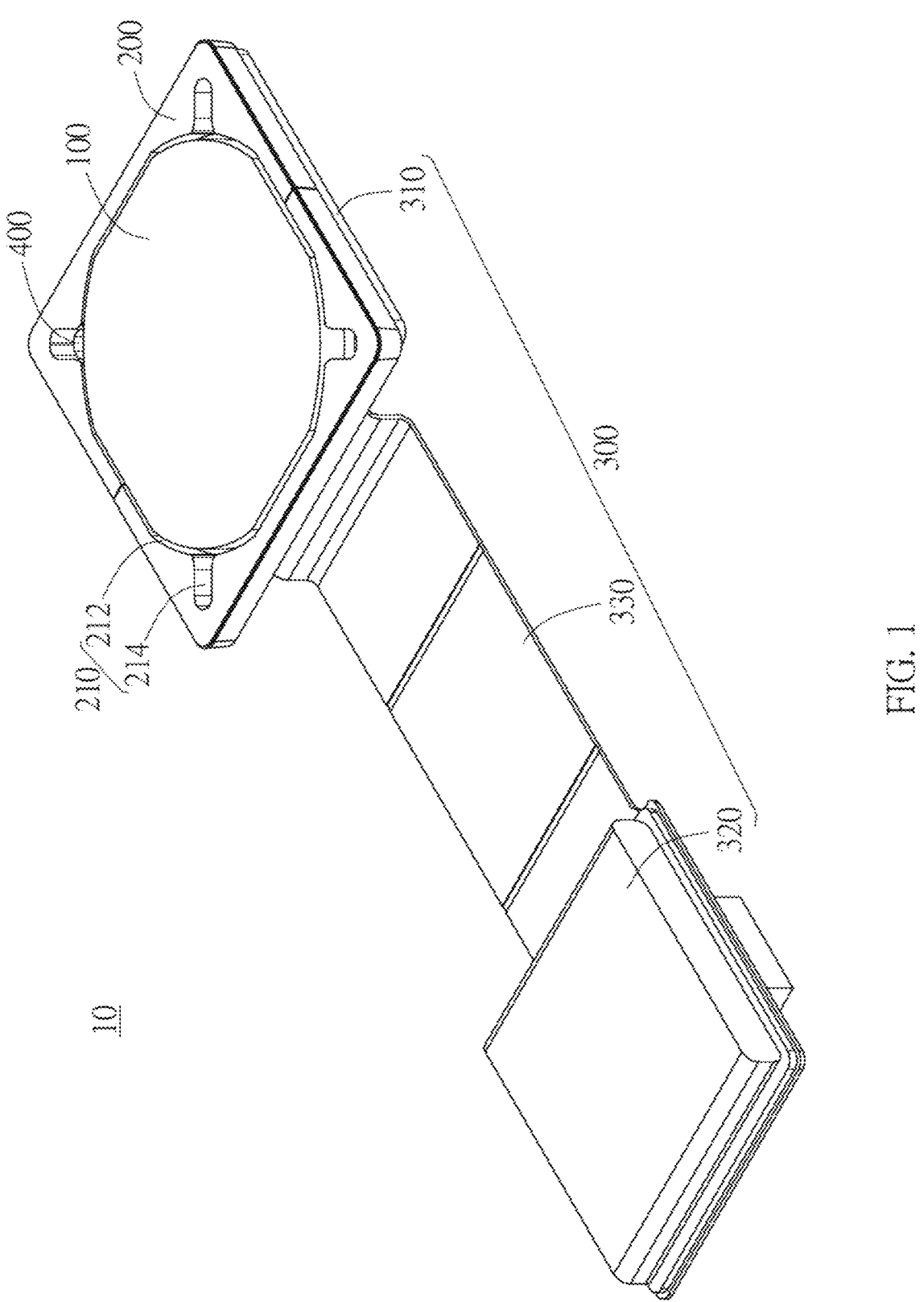
FIG. 1 is a perspective view of the backlit finger feature recognition structure in a first embodiment of the invention.
Figure 2A:
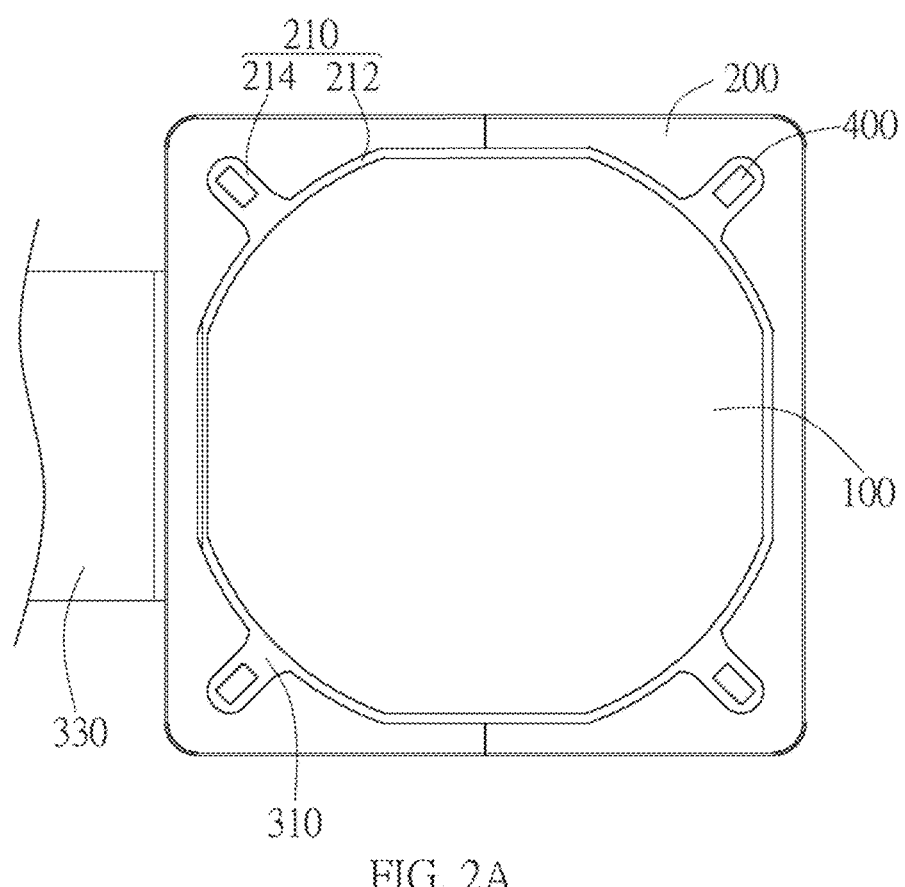
FIGS. 2A and 2B are respectively a partial plane view and a partial cross-sectional view of FIG. 1 to show the relative positions of the feature sensor, the light guide member, and the illuminant.
Figure 2B:
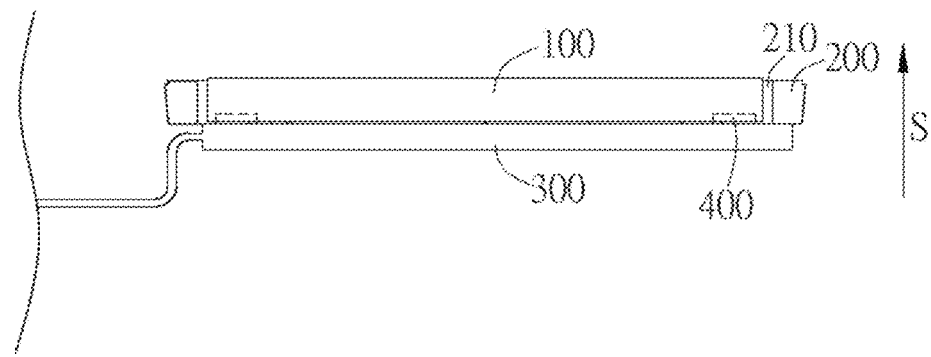

Referring to FIG. 1 to FIG. 2B, FIG. 1 is a perspective view of the backlit finger feature recognition structure 10 in a first embodiment of the invention; FIGS. 2A and B are respectively a partial plane view and a partial cross-sectional view of FIG. 1 to show the relative positions of the feature sensor, the light guide member, and the illuminant. In an embodiment, the backlit finger feature recognition structure 10 includes a feature sensor 100, a light guide member 200, a circuit board assembly 300, and an illuminant 400. The feature sensor 100 is configured to sense the finger feature. The light guide member 200 is disposed surrounding the feature sensor 100. The circuit board assembly 300 is disposed corresponding to the light guide member 200 and electrically connected to the lower side of the feature sensor 100. The illuminant 400 is electrically connected to the circuit board assembly 300. In the stacking direction S, the illuminant 400 does not overlap the feature sensor 100, and the light guide member 200 guides light emitted from the illuminant 400 to be emitted along the stacking direction S.

Specifically, the feature sensor 100 can be a finger feature recognition chip, which is configured to extract the finger feature of the user for subsequent recognition. For example, the finger feature can be a fingerprint and/or a finger-vein. The feature sensor 100 can be a capacitive, optical, or ultrasonic fingerprint (and/or finger-vein) extraction/recognition chip. The recognition processing unit and the storage unit (not shown) can be integrated at the feature sensor end or the system end. In an embodiment, the recognition processing unit and the storage unit are preferably integrated at the system end, such as the central processing unit (CPU) and the memory of the computer mother board, but not limited thereto. In another embodiment, the recognition processing unit and the storage unit can be integrated to the electronic device that is equipped with the backlit finger feature recognition structure 10. As shown in FIG. 2A, the feature sensor 100 has a non-quadrilateral cut shape to form a retreat space (e.g. 101 of FIG. 3) between the light guide member 200 and the feature sensor 100, and the illuminant 400 is preferably disposed in the retreat space 101. From another aspect, in the plane view of FIG. 2A, the illuminant 400 is located between the light guide member 200 and the feature sensor 100, and the illuminant 400 is preferably at least partially located in a region defined (or surrounded) by extending lines of adjacent outmost sides of the feature sensor 100 (e.g. the retreat space 101).

Figure 3:
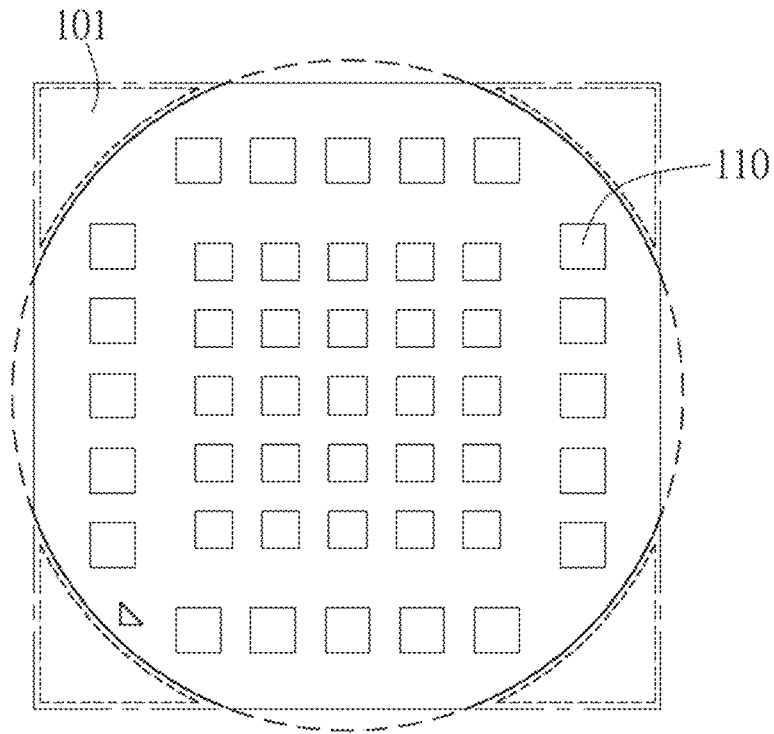
FIG. 3 is a plane view of the feature sensor in an embodiment of the invention to show the cutting design of the feature sensor.
Figures 6A, 6B, 6C:
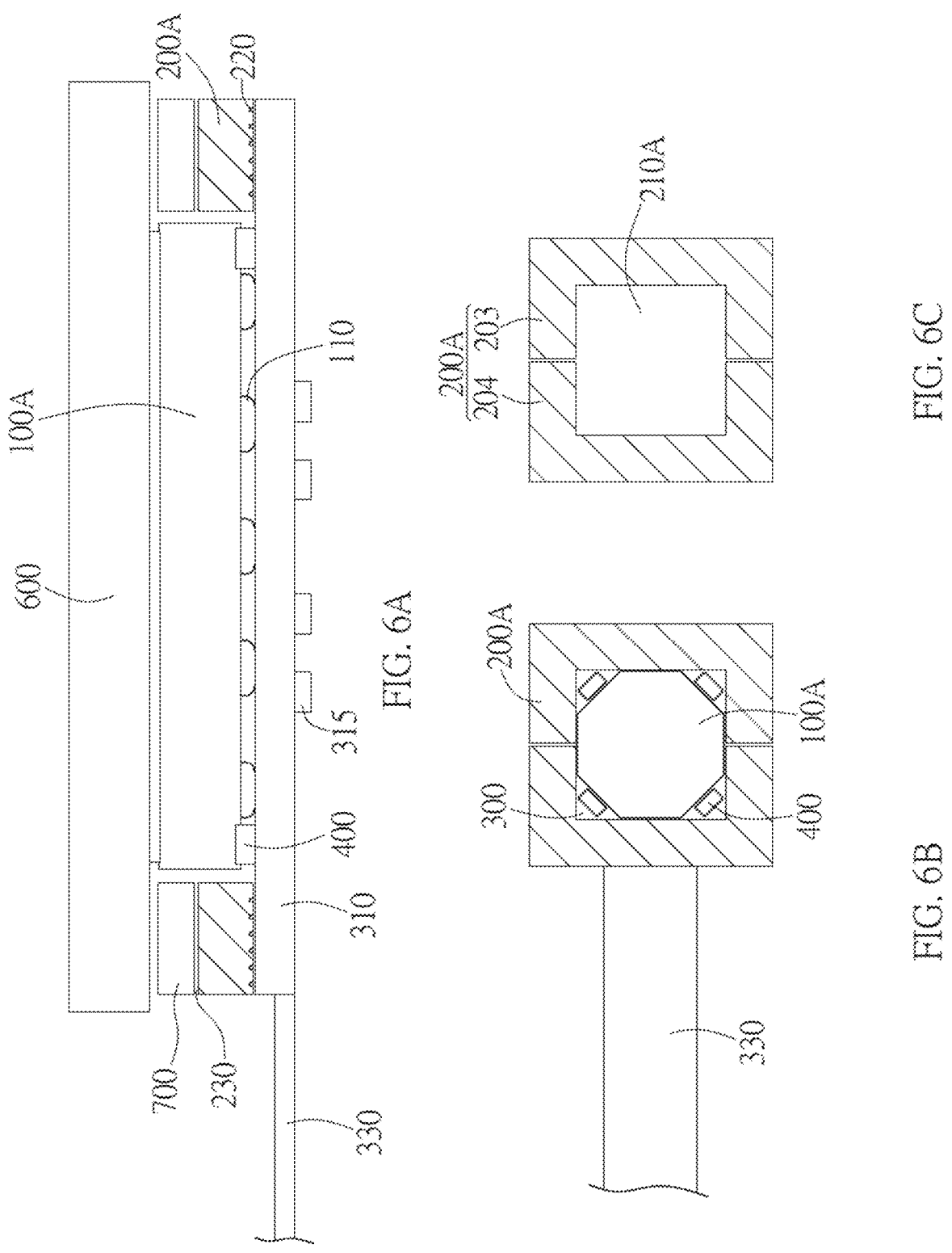
FIGS. 6A and 6B are respectively a partial cross-sectional view and a partial plane view of the backlit finger feature recognition structure in a second embodiment of the invention.
FIG. 6C is a plane view of the light guide member in another embodiment of the invention.

Also referring to FIG. 3, FIG. 3 is a plane view of the feature sensor 100 in an embodiment of the invention to show the cutting design of the feature sensor 100. Specifically, as shown in FIG. 3, when cutting the feature sensor 100, it is typically cut into a smaller rectangular (or square) shaped chip. Since the user's pressing or contact usually occurs in the center of the chip, the surrounding corners (e.g. the location of the retreat space 101 shown by the dotted line in FIG. 3) become inefficient chip areas (e.g. areas of low sensing possibility) or even invalid chip areas (e.g. corners are non-sensing areas). The invention reduces one or more corner spaces (preferably at least two corner spaces) of the feature sensor 100 through a deliberate cutting design (e.g. the cutting design of arch-chamfer shown by the solid line in FIG. 3) and provides the retreat space 101 for disposing the illuminant 400, thereby improving the space utilization. For example, the cutting design of the feature sensor 100 preferably reserves 85% to 95% of the chip area of the feature sensor 100 to form the chamfered corner(s), but not limited thereto. According to practical applications, the feature sensor 100 can be cut to obtain the maximum retreat space(s) without sacrificing the sensing performance and electrical connection of the feature sensor 100 (i.e., without damaging the connection pad 110). As such, the retreat space 101 for arranging the illuminant 400 can be formed between the feature sensor 100 and the light guide member 200 without significantly increasing the size of the light guide member 200 or by maintaining or even reducing the size of the light guide member 200. With such a design, the illuminant 400 and the feature sensor 100 can be arranged side by side, and it is not necessarily to arrange the illuminant 400 and the feature sensor 100 overlappingly in the vertical direction (or the stacking direction S), effectively reducing the overall thickness. In this embodiment, the feature sensor 100 is illustrated to be cut with four arch chamfered corners, but not limited thereto. In other embodiments, for example as shown in FIG. 6B, the corners of the feature sensor 100 can be beveled to have an octagonal shape.

Figure 4A:
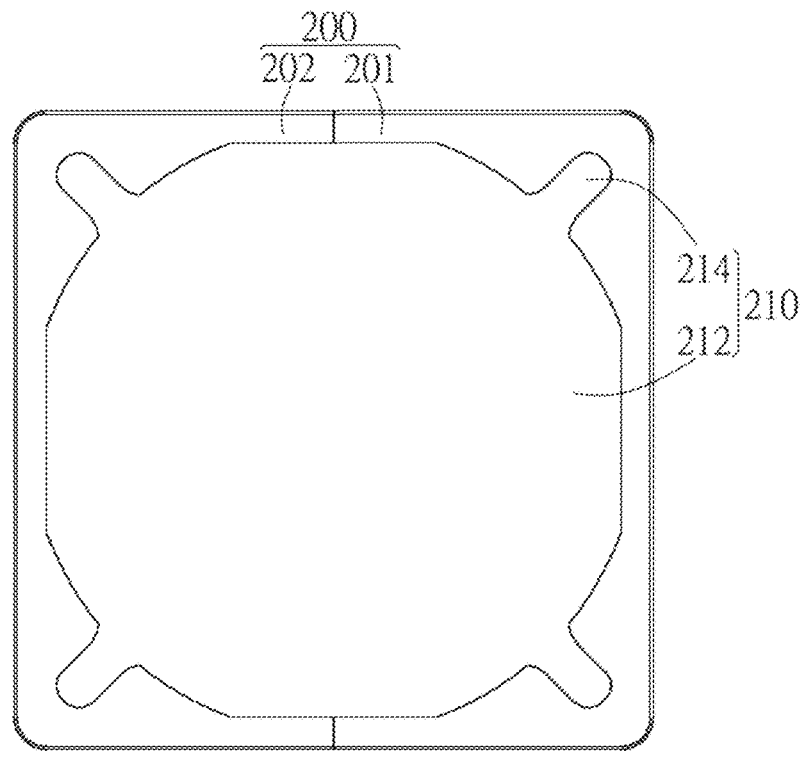
FIGS. 4A and 4B are respectively an assembly view and a disassembly view of the light guide member in an embodiment of the invention.

The light guide member 200 can be made of any suitable optical materials and is configured to guide the light emitted from the illuminant 400 to be emitted upward along the stacking direction S for indicating the sensing area of the backlit finger feature recognition structure 10 (i.e., the location of the feature sensor 100). Referring to FIG. 2A and FIG. 4A, FIG. 4A is a schematic view of the light guide member 200 in an embodiment. As shown in FIG. 2A and FIG. 4A, the light guide member 200 includes a plate body, and the plate body has an opening 210. The plate body is disposed on the circuit board assembly 300, and the feature sensor 100 and the illuminant 400 are accommodated in the opening 210. From another aspect, the entire light guide member 200 is disposed on the circuit board assembly 300 to effectively reduce the possibility of hindering the light path by the circuit board assembly 300. Specifically, the opening 210 is a through hole that penetrates through the plate body of the light guide member 200 in the thickness direction (or the stacking direction S). In this embodiment, the opening 210 may include a first receiving slot 212 and a second receiving slot 214. The first receiving slot 212 is configured to accommodate the feature sensor 100. The second receiving slot 214 extends from the first receiving slot 212 and is configured to accommodate the illuminant 400. The first receiving slot 212 preferably has a shape corresponding to the feature sensor 100. The second receiving slot 214 preferably has a shape and number corresponding to the illuminant 400. As shown in FIG. 2A, the light guide member 200 has four second receiving slots 214, which are respectively disposed at four corners of the first receiving slot 212, and the second receiving slot 214 preferably at least partially (or completely) corresponds to the retreat space 101 formed after the feature sensor 100 is cut. In other words, in the stacking direction S, the second receiving slot 214 at least partially overlaps the retreat space 101 of FIG. 3. In this embodiment, the second receiving slot 214 can be an elongated slot, which corresponds to the side edge (preferably the long side) of the illuminant 400, so light emitted from the illuminant 400 can effectively enter the light guide member 200 from the adjacent sidewall of the second receiving slot 214, which improves the utilization of light, but not limited thereto. According to practical applications, the first receiving slot 212 and the second receiving slot 214 can be integrated into an opening having a single geometric shape (such as but not limited to the square-shaped opening 210A shown in FIG. 6B) to simplify the processing of the light guide member 200.

Figure 4B:
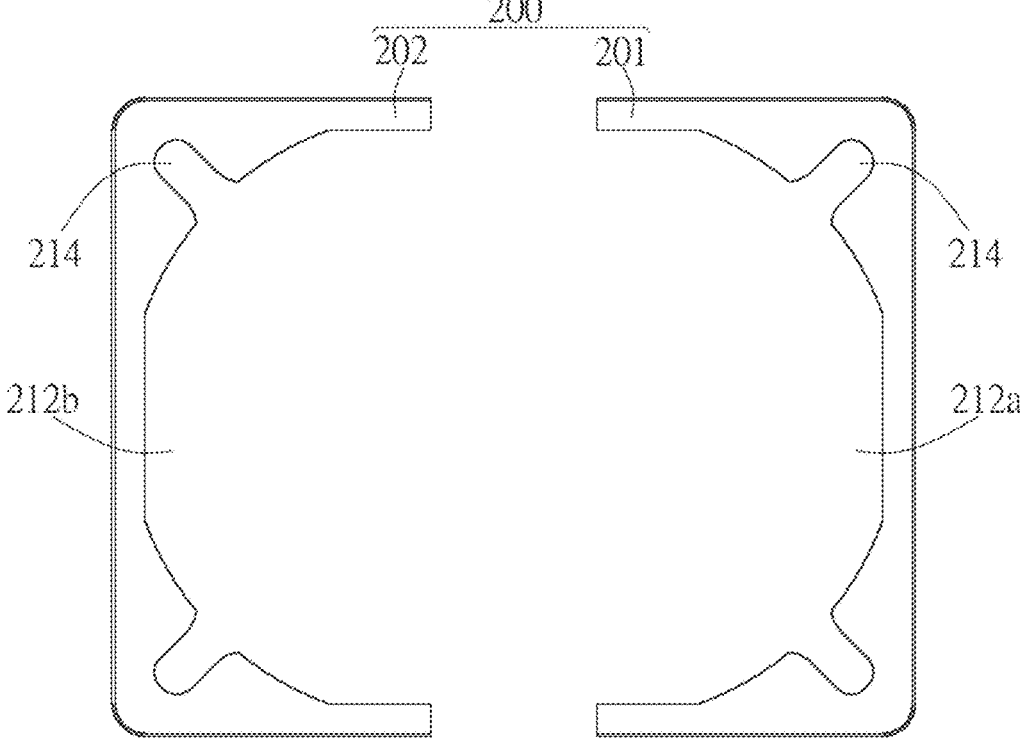

Moreover, in an embodiment, the light guide member 200 is preferably formed by combining a plurality of detachable plate bodies, so each plate body can be a flat plate to facilitate the processability and manufacturability of the light guide member 200. In addition, the light guide member 200 constituted by a plurality of detachable plate bodies can also enhance the flexibility of the assembly process of the backlit finger feature recognition structure 10, but not limited thereto. According to practical applications, the plate body of the light guide member 200 can be a single component, so the light guide member 200 is a single flat plate having the opening 210. Referring to FIGS. 4A and 4B, FIG. 4B is a disassembly view of the light guide member 200. As shown in FIGS. 4A and 4B, in this embodiment, the light guide member 200 can be formed by combining two plate bodies 201, 202. The two plate bodies 201, 202 can be substantially mirror-image components to simplify the number of components and the complexity of manufacturing, but not limited thereto. Depending on the design of the opening 210, the plate bodies 201, 202 can be different components without mirror-image relationship. Corresponding to the above design of the first receiving slot 212 and the second receiving slots 214, the plate bodies 201, 202 can be corresponding U-shaped components, and respectively have a first partial opening 212a and a second partial opening 212b. Each of the plate bodies 201, 202 has two second receiving slots 214, which are disposed at the corners of the first partial opening 212a or the second partial opening 212b. As shown in FIG. 4A, when the plate bodies 201, 202 are disposed side by side and combined to form the light guide member 200, the first partial opening 212a and the second partial opening 212b together form the first receiving slot 212.

Figures 5A, 5B:
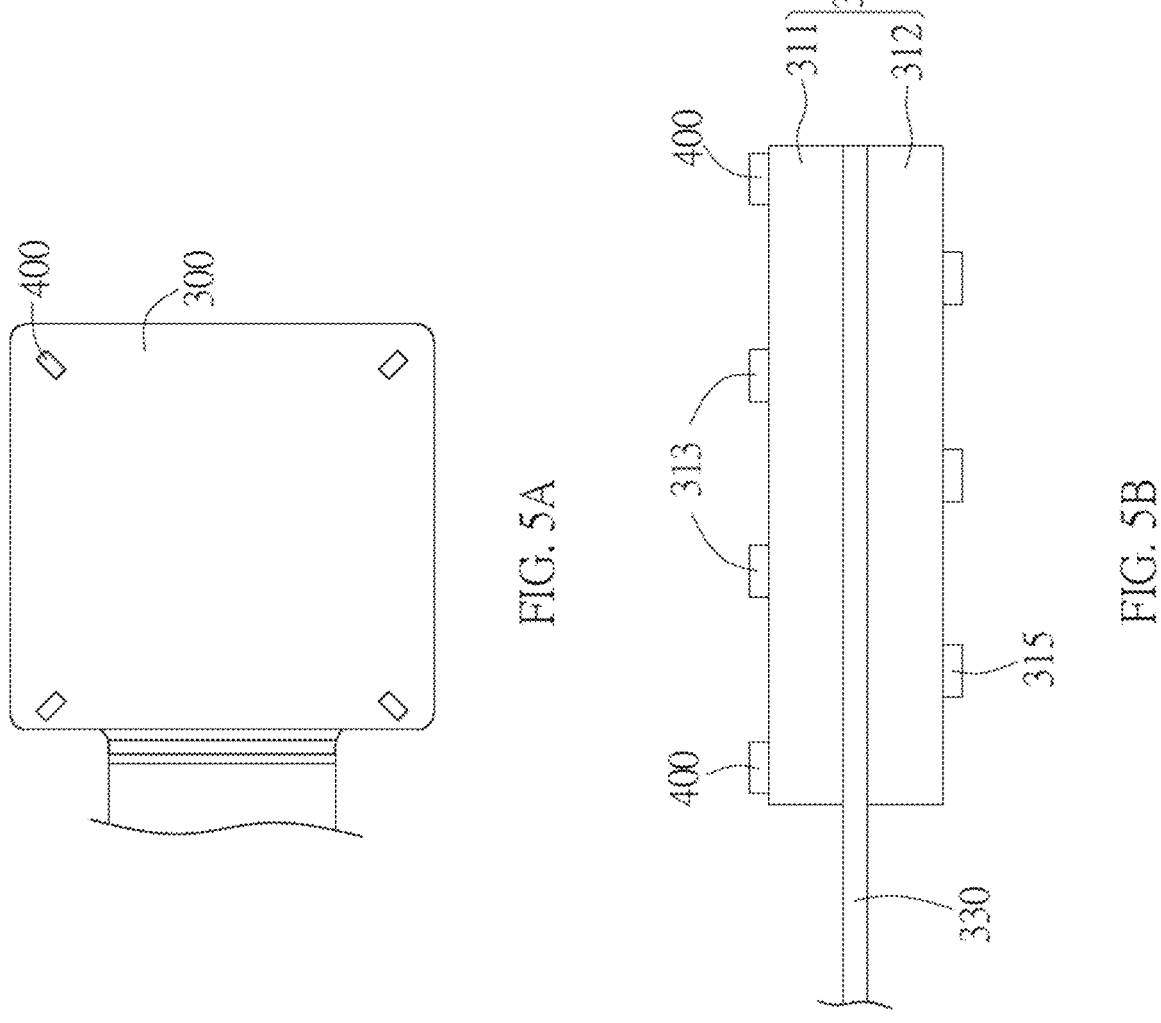
FIGS. 5A and 5B are respectively a partial plane view and a partial cross-sectional view of the circuit board assembly in an embodiment of the invention.

Referring FIGS. 5A and 5B, FIGS. 5A and 5B are respectively a partial plane view and a partial cross-sectional view of the circuit board assembly 300 in an embodiment of the invention. In an embodiment, the circuit board assembly 300 is preferably a flex-rigid composite circuit board including a flexible printed circuit board (FPC) 330 and one or more rigid circuit boards (e.g. 310, 320). The feature sensor 100 and the illuminant 400 are preferably disposed on the rigid circuit board. Specifically, the circuit board assembly 300 may include a plurality of functional circuit boards, and a plurality of rigid circuit boards (e.g. 310, 320) serving as the functional circuit boards are preferably connected through the flexible printed circuit board 330. In other words, the flexible printed circuit board 330 is configured to carry and electrically connect the plurality of functional circuit boards. For example, the plurality of functional circuit boards can include a feature board 310 and an interface board 320 (shown in FIG. 1). The feature board 310 is disposed with the feature circuit, which is configured to be electrically connected to the feature sensor 100 and to output the feature signal sensed by the feature sensor 100. The interface board 320 can have the circuitry and the connector and is electrically connected to the feature board 310 and the system end (e.g. connected to the connection interface of the computer mother board) to output the feature signal to the system end, thereby achieving the function of finger feature recognition. Moreover, each functional circuit board can be implemented with one or more circuit boards, so the one or more circuit boards may have corresponding circuits to perform the function of the corresponding functional circuit board individually or in combination. As shown in FIG. 5B, in this embodiment, the feature board 310 may include an upper circuit board 311 and a lower circuit board 312, which are respectively disposed on and connected to the upper side and the lower side of the flexible printed circuit board 330. The upper circuit board 311 and the lower circuit board 312 may together have the functional circuit of the feature board 310, and at least the upper circuit board 311 may further include a light source circuit. As such, the feature sensor 100 and the illuminant 400 can be disposed on the upper side of the feature board 310 and electrically connected to the upper circuit board 311. For example, the upper circuit board 311 may have a contact 313, and the connection pad 110 of the feature sensor 100 is electrically connected to the contact 313. Moreover, one or more electronic devices 315 such as resistor, capacitor, electrostatic discharge (ESD) protection device (e.g. transient voltage suppressor, TSV) can be optionally disposed on the circuit board (e.g. the lower circuit board 312) to provide the required electrical characteristics. In this embodiment, the illuminant 400 and the feature sensor 100 can be on a same side or a same surface of the circuit board assembly 300, such as the upper side or the upper surface of the flexible printed circuit board 330. Moreover, the illuminant 400 and the feature sensor 100 can be disposed on the same or different circuit boards at the same side, and the illuminant 400 does not overlap the feature sensor 100 in the stacking direction S. In this embodiment, the upper circuit board 311 or the lower circuit board 312 is illustrated as a single circuit board, but not limited thereto. In another embodiment, the upper circuit board 311 and/or the lower circuit board 312 can be implemented as a circuit structure with multiple side-by-side arranged or partially stacked circuit boards. In this embodiment, the flexible printed circuit board 330 preferably does not have a bending (or folding) section for stacking multiple circuit boards, so the stress induced by bending (or folding) the flexible printed circuit board 330 can be reduced, but not limited thereto. According to practical applications, the flexible printed circuit board 330 may have a bending (or folding) section to form a structure of multiple stacked circuit boards.

The illuminant 400 can be any suitable light source configured to provide light. For example, the illuminant 400 can be a single-chip or multiple-chip light emitting diode (LED), mini-LED, micro-LED, and the like. The illuminant 400 can be a side-lighting or five-face (e.g. upper/left/right/front/rear faces) lighting illuminant. As shown in FIG. 2A, in this embodiment, four illuminants 400 are respectively disposed in the second receiving slots 214 at four corners, but not limited thereto. In other embodiments, the number of the illuminant 400 may vary, multiple illuminants 400 can be disposed in a same second receiving slot 214, and/or an additional illuminant can be disposed on the lower side of the circuit board assembly 300. In other words, according to practical applications, multiple illuminants 400 can be located at the same or different surfaces of the circuit board assembly 300, and at least one of the illuminants 400 does not overlap the feature sensor 100 in the stacking direction S to effectively reduce the overall thickness.

Referring to FIGS. 6A to 6C, FIGS. 6A and 6B are respectively a partial cross-sectional view and a partial plane view of the backlit finger feature recognition structure in a second embodiment of the invention, and FIG. 6C is a plane view of the light guide member 200A in another embodiment of the invention. Hereinafter, the differences between this embodiment and the previous embodiment are described. For the same or similar details, please refer to the relevant description of the previous embodiment. As shown in FIGS. 6A to 6C, in this embodiment, the light guide member 200A has a rectangular (or square) opening 210A, so the feature sensor 100A and the illuminant(s) 400 are together disposed in the opening 210A. The light guide member 200A is preferably formed by combining two plate bodies 203, 204. As shown in FIG. 6A, the light guide member 200A further includes a plurality of light-exit dots 220. The light-exit dots 220 are disposed at a side of the light guide member 200A opposite to the light-exit surface 230 (or the light-output direction) of the light guide member 200A. For example, the top surface of the light guide member 200A can be the light-exit surface 230, and the light-exit dots 220 can be microstructures, which are arranged in a predetermined pattern and shape on the bottom surface of the light guide member 200A. With the design of light-exit dots 220 on the light guide member 200A, the light path can be controlled, so the light distribution can be more uniform, promoting the optical uniformity.

In this embodiment, the backlit finger feature recognition structure can further include an optical film 700. The optical film 700 is preferably disposed on the light-exit surface 230 of the light guide member 200A to enhance the uniformity of light output. For example, the optical film 700 can be a diffusion film or a light-permeable ink layer. The light-permeable ink layer can be a white ink layer, which is printed on the light-exit surface 230 of the light guide member 200A, but not limited thereto. In this embodiment, the feature sensor 100A is shaped as an octagon with beveled corners to provide the retreat spaces 101 for accommodating the illuminants 400. Such a configuration can also achieve the effects of the previous embodiment, such as improving the space utilization, reducing the overall thickness, facilitating the processability and manufacturability of the light guide member 200A.

Figures 7A, 7B:
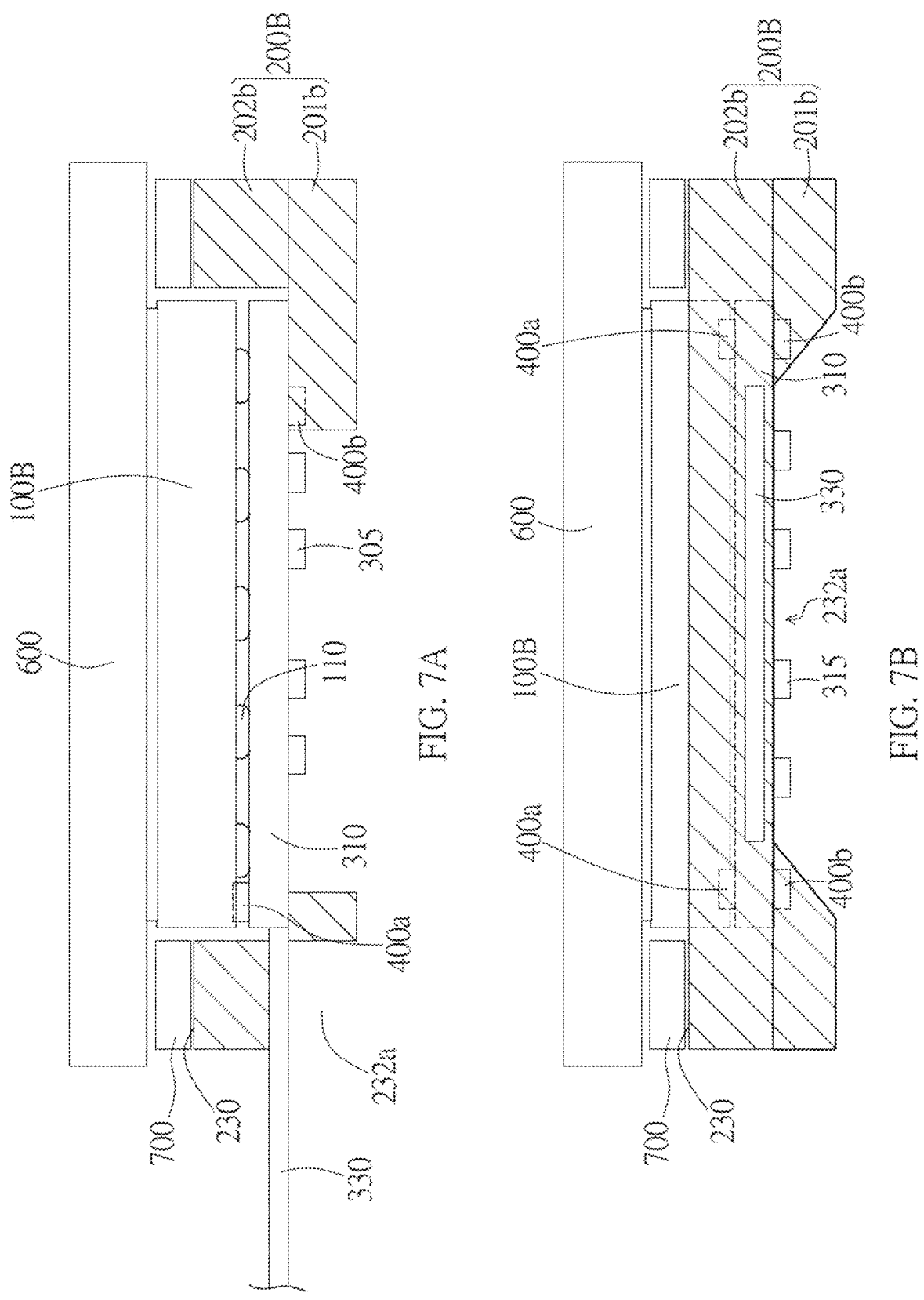
FIGS. 7A and FIG. 7B are partial cross-sectional views of the backlit finger feature recognition structure in a third embodiment of the invention from different viewing angles.
Figure 7C:
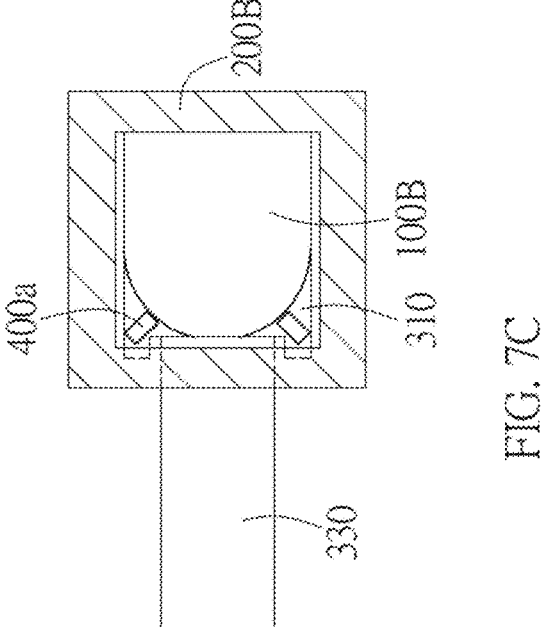
FIGS. 7C and 7D are respectively a top view and a bottom view of FIG. 7A.
Figure 7D:
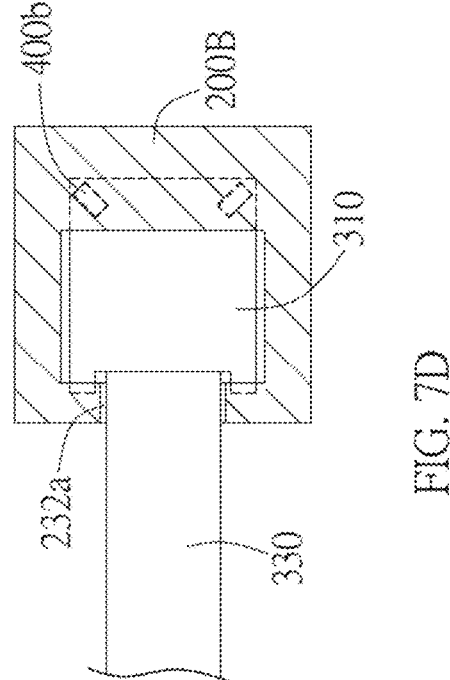
Figure 8:
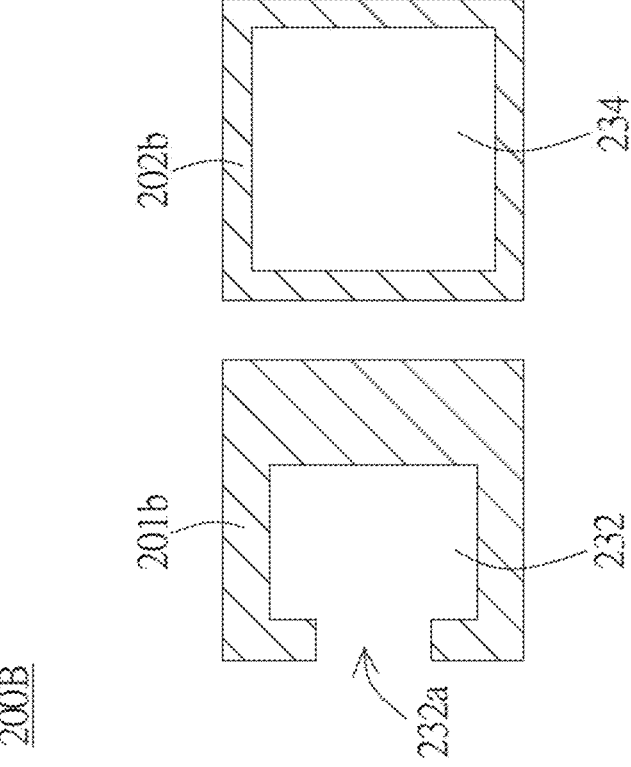
FIG. 8 is a plane view of the light guide member in a further embodiment of the invention.

Referring to FIGS. 7A to 7D, FIGS. 7A and FIG. 7B are partial cross-sectional views of the backlit finger feature recognition structure in a third embodiment of the invention from different viewing angles, and FIGS. 7C and 7D are respectively a top view and a bottom view of FIG. 7A. Hereinafter, the differences between this embodiment and the previous embodiments are described. For the same or similar details, please refer to the relevant description of the previous embodiments. As shown in FIGS. 7A to 7D, in this embodiment, the light guide member 200B is a three-dimensional (or box-shaped) frame. The light guide member 200B has a window 232a on the sidewall. The window 232a allows a portion of the circuit board assembly 300 to extend therethrough to outside of the light guide member 200B. Specifically, referring to FIG. 8, FIG. 8 is a plane view of the light guide member 200B in a further embodiment of the invention. In this embodiment, the light guide member 200B can include a first plate body 201b and a second plate body 202b. The first plate body 201b and the second plate body 202b are respectively located under and above the circuit board assembly 300. The first plate body 201b and the second plate body 202b respectively have a first opening 232 and a second opening 234. The first opening 232 allows a portion of the circuit board assembly 300 to extend therethrough to outside of the light guide member 200B. The feature sensor 100 and the illuminant 400 are disposed in the second opening 234. For example, the first plate body 201b and the second plate body 202b both are flat plates. The first opening 232 has an opened ring shape, and the second opening 234 has a closed ring shape. When the light guide member 200B is assembled, the second plate body 202b is stacked on the first plate body 201b, and the first opening 232 forms the window 232a between the first plate body 201b and the second plate body 202b. The feature board 310 of the circuit board assembly 300 is located on and supported by the first plate body 201*b*, and an end of the flexible printed circuit board 330 of the circuit board assembly 300 that carries the interface board 320 extends through the window 232*a* to outside of the light guide member 200B while the feature sensor 100 and the illuminant 400 are accommodated in the second opening 234. In this embodiment, the first plate body 201*b* and the second plate body 202*b* of the light guide member 200B are detachable to facilitate the processability and manufacturability of the light guide member 200B, but not limited thereto. In other embodiments, the first plate body 201*b* and the second plate body 202*b* can be formed as an integral structure. In other words, the light guide member 200B can be an integral structure or a detachable structure.

As shown in FIG. 7C, in this embodiment, the feature sensor 100B can be cut at two corners (e.g. upper/lower left corners) to form the retreat spaces 101 (as described above) to accommodate the illuminants 400*a*. Additional illuminant(s) 400*b* can be disposed at the corners that the feature sensor 100B is remained uncut, to promote the brightness and uniformity of light. For example, the illuminants 400*b* can be disposed on the lower side of the circuit board assembly 300 (e.g. on the lower circuit board 312 of the feature board 310), and the first plate body 201*b* preferably at least partially overlaps the illuminants 400*b* in the stacking direction S, so the light emitted downward from the illuminants 400*b* can be guided through the first plate body 201*b* and the second plate body 202*b* and emitted upward from the light-exit surface 230 of the second plate body 202*b*.

Figure 9A:
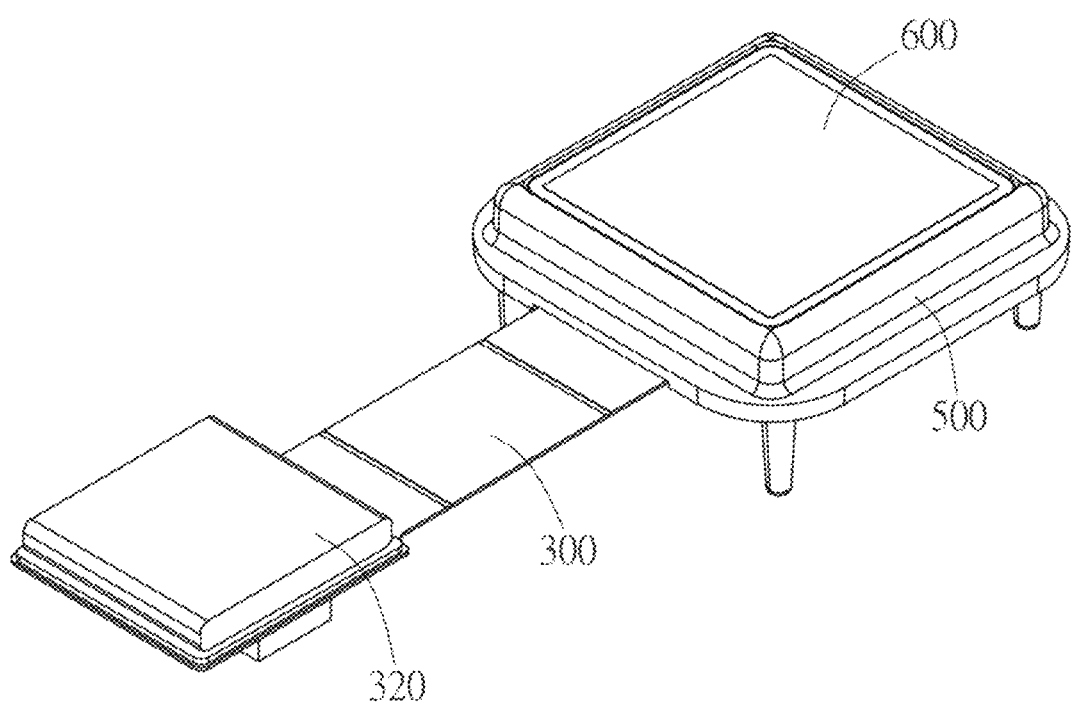
FIGS. 9A to 9D are respectively a perspective view, partially exploded top and bottom views, and a partial cross-sectional view in a fourth embodiment of the invention.
Figure 9B:
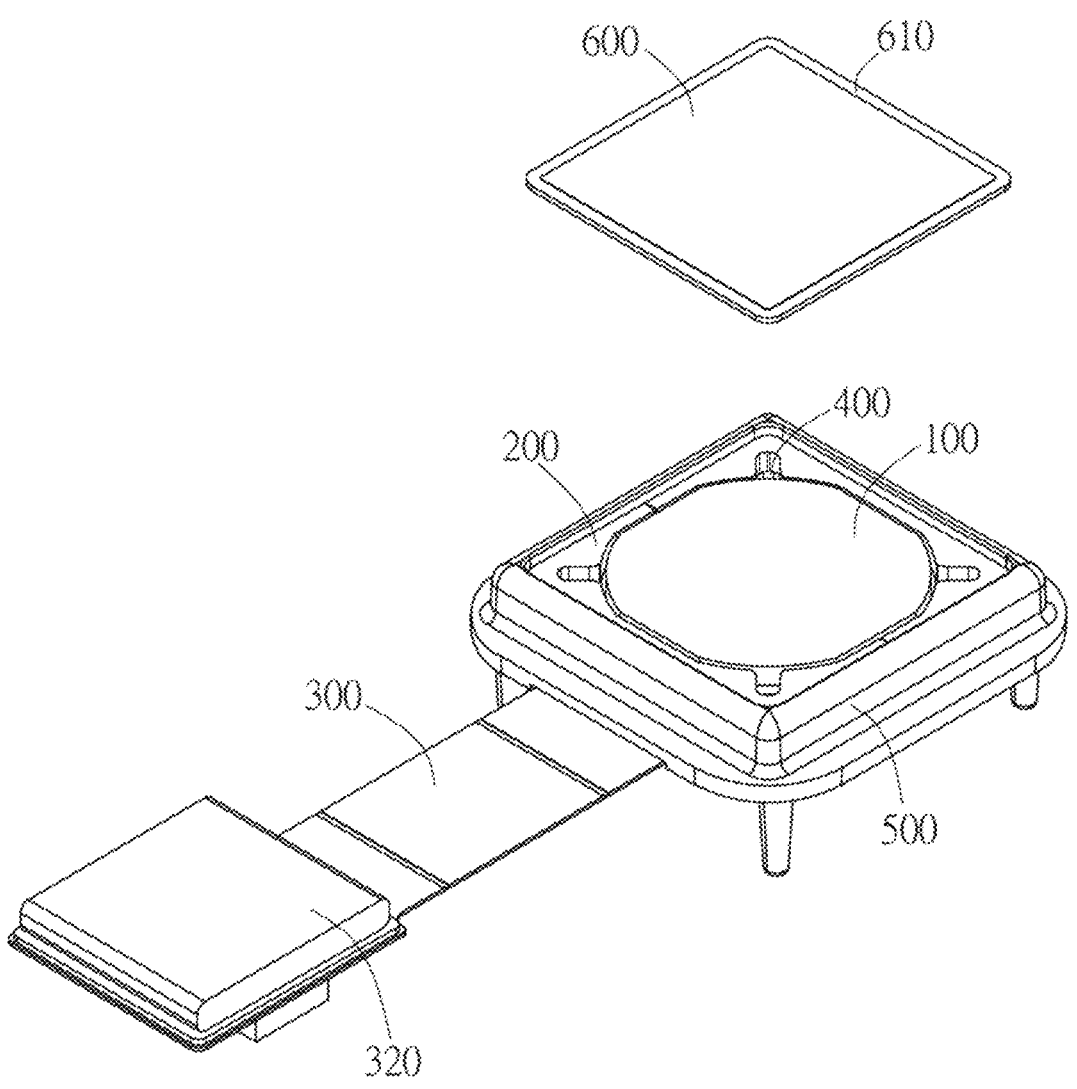
Figure 9C:
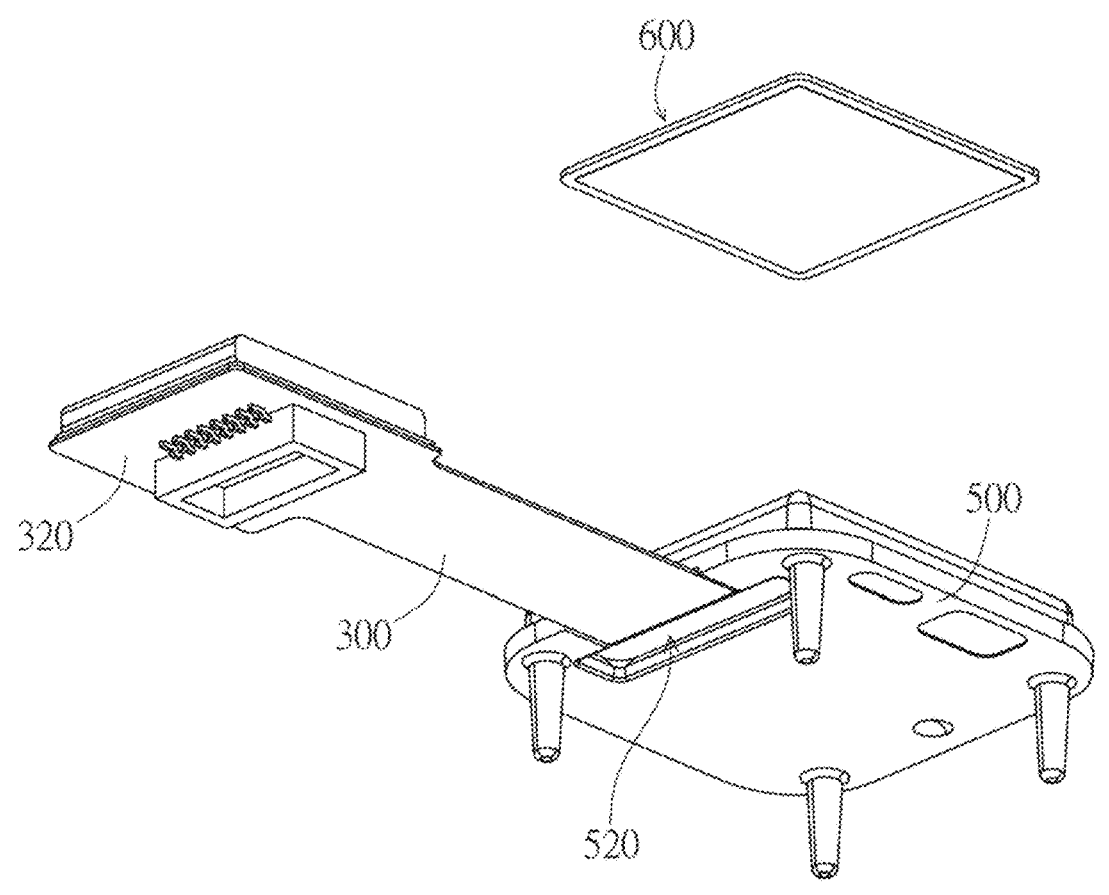
Figure 9D:
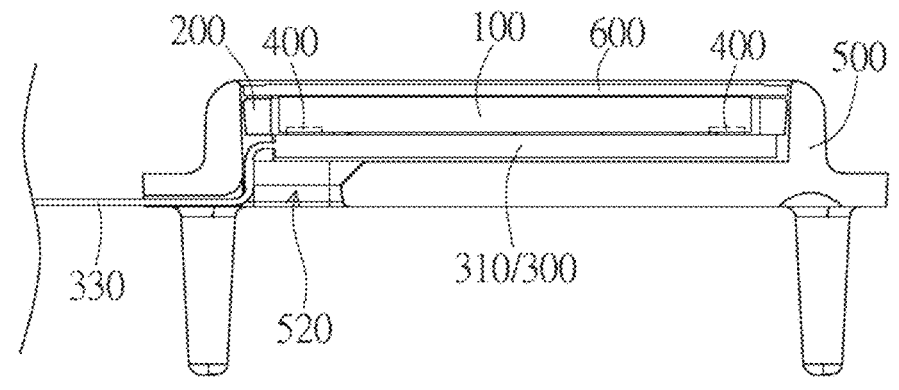
Figure 10:
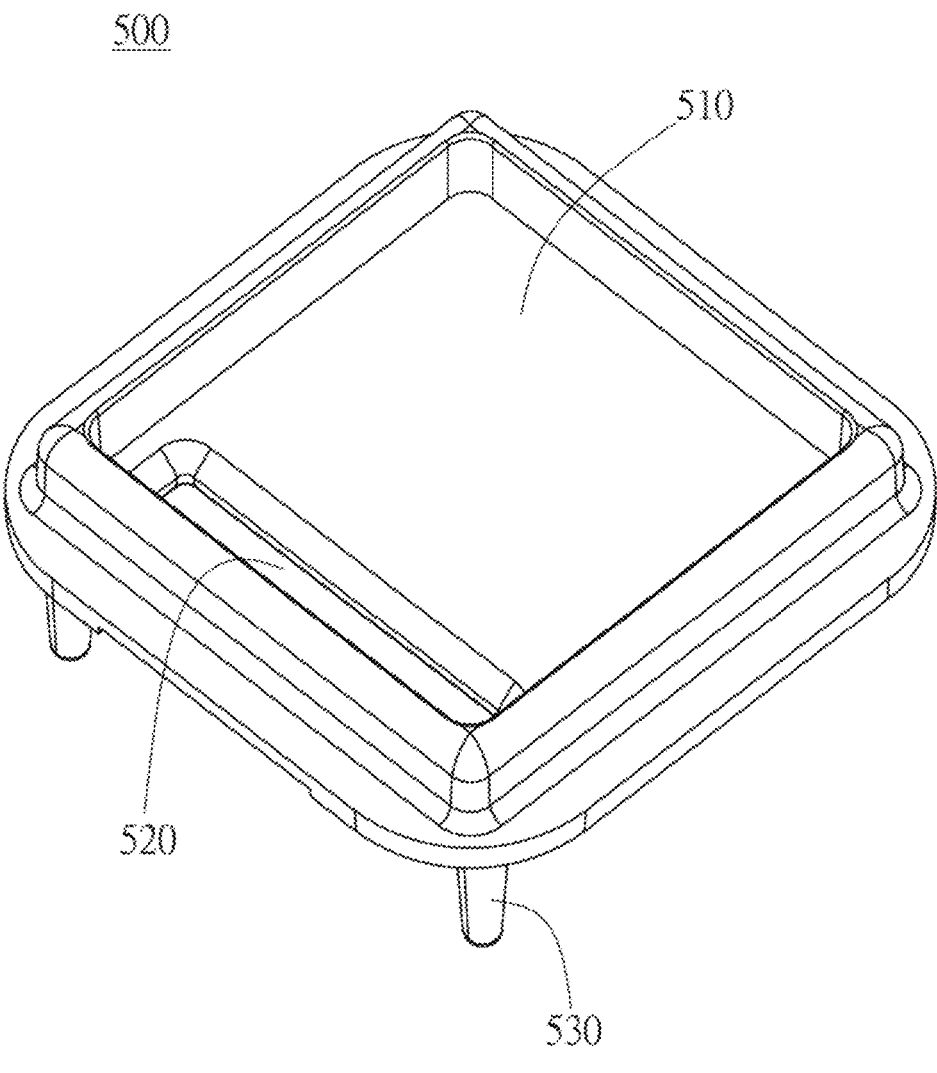
FIG. 10 is a perspective view of the base holder in an embodiment of the invention.

It is noted that according to practical applications, the light-exit dots 220 and the optical film 700 can be selectively implemented in any of the previous embodiments, not limited to the embodiment shown in the drawings. Moreover, the cover 600 shown in FIG. 6A and FIG. 7A will be described below. Referring to FIGS. 9A to 9D, FIGS. 9A to 9D are respectively a perspective view, partially exploded top and bottom views, and a partial cross-sectional view in a fourth embodiment of the invention. As shown in FIGS. 9A to 9D, the backlit finger feature recognition structure of the invention can further include a base holder 500 and a cover 600, so the backlit finger feature recognition structure 10 can form a modular structure (e.g. a backlit finger feature recognition module). The base holder 500 serves as the housing of the backlit finger feature recognition module and is configured to support components of the backlit finger feature recognition module. The cover 600 is correspondingly disposed on the base holder 500 and configured to provide a plane for the user's finger to place or press. Specifically, referring to FIG. 10, FIG. 10 is a perspective view of the base holder 500 in an embodiment of the invention. As shown in the figure, the base holder 500 has an accommodation space 510 and a slot 520. The accommodation space 510 is configured to accommodate the feature sensor 100, the light guide member 200, the circuit board assembly 300, and the illuminant 400. The slot 520 is formed on the base holder 500 and communicates with the accommodation space 510 to allow the circuit board assembly 300 to extend from the slot 520 to outside of the base holder 500. For example, the base holder 500 can be a housing with a hollow portion. The hollow portion can be the accommodation space 510, and the sidewall of the housing around the accommodation space 510 is configured to surround the sidewalls of the components (e.g. the feature sensor 100, the light guide member 200, the circuit board assembly 300). The slot 520 preferably penetrates though the bottom of the base holder 500 to serve as a channel communicating the accommodation space 510 with the external environment. When the circuit board assembly 300 is disposed on the base holder 500, one end of the circuit board assembly 300 which overlaps the light guide member 200 in the stacking direction S (i.e. the end including the feature board 310) is located in the accommodation space 510, and the other end of the circuit board assembly 300 which extends out from the light guide member 200 (i.e., the end including the interface board 320) can extend downward through the slot 520 to outside of the base holder 500 and then is connected to the system end. In this embodiment, the base holder 500 preferably has a shape corresponding to the shape of the light guide member 200 and the feature board 310, such as rectangular (or square) shape, but not limited thereto. According to practical applications, the base holder 500 can have any suitable shape, such as circular, polygonal, and other geometric shapes. The base holder 500 can further include a positioning portion 530, which is configured to be combined with the electronic device. For example, the positioning portion 530 can be implemented as a rod, which extends outward from the bottom of the housing and is inserted into the hole of the electronic device to achieve the positioning effect, but not limited thereto. The base holder 500 can be positioned on the electronic device by any means as appropriate.

The cover 600 is disposed on the base holder 500 to cover the accommodation space 510. The cover 600 preferably has a light-permeable portion 610. In the stacking direction S (or light-output direction), the light guide member 100 at least partially overlaps the light-permeable portion 610. From another aspect, the orthographic projection of the light guide member 200 on the cover 600 preferably at least partially overlaps the light-permeable portion 610. Specifically, the cover 600 can be a plate made of glass, polymers, for example. The cover 600 is preferably connected to the feature sensor 100 through an adhesive material, so the cover 600 and the base holder 500 have an integral outer appearance, but not limited thereto. In an embodiment, the entire cover 600 can be the light-permeable portion 610, but not limited thereto. As shown in FIG. 9B, in this embodiment, the light-permeable portion 610 is preferably a ring-shaped band (e.g. square ring) formed on the periphery of the cover 600. When the light guide member 200 guides the light of the illuminant 400 upward to emit from the top surface of the light guide member 200 (i.e., the light-exit surface 230 mentioned above), light can be substantially emitted from the light-permeable portion 610 to form a ring-shaped light pattern around the feature sensor 100, which not only indicates the location of the sensing areas to the user, but also enhances the optical effect of the appearance.

It is noted that FIGS. 9A to 9D illustrate the backlit finger feature recognition structure 10 of FIG. 1 is disposed in the base holder 500, but not limited thereto. In other embodiments, the backlit finger feature recognition structure of any of the previous embodiments can be disposed in the base holder 500 to form the modular structure.

Although the preferred embodiments of the invention have been described herein, the above description is merely illustrative. The preferred embodiments disclosed will not limit the scope of the invention. Further modification of the invention herein disclosed will occur to those skilled in the respective arts and all such modifications are deemed to be within the scope of the invention as defined by the appended claims.

What is claimed is:

1. A backlit finger feature recognition structure, comprising:

a feature sensor configured to sense a finger feature;

a light guide member disposed surrounding the feature sensor;

a circuit board assembly disposed corresponding to the light guide member and electrically connected to a lower side of the feature sensor; and an illuminant electrically connected to the circuit board assembly, wherein in a stacking direction, the illuminant does not overlap the feature sensor, and the light guide member guides light emitted from the illuminant to be emitted along the stacking direction;

wherein the feature sensor has a non-quadrilateral cut shape to form a retreat space between the light guide member and the feature sensor, and the illuminant is located in the retreat space.

2. The backlit finger feature recognition structure of claim 1, wherein the illuminant and the feature sensor are located at a same side of the circuit board assembly.

3. The backlit finger feature recognition structure of claim 1, wherein the light guide member comprises a plate body with an opening; the plate body is disposed on the circuit board assembly; the feature sensor and the illuminant are accommodated in the opening.

4. The backlit finger feature recognition structure of claim 3, wherein the opening comprises a first receiving slot and a second receiving slot; the first receiving slot is configured to accommodate the feature sensor; the second receiving slot extends from the first receiving slot and is configured to accommodate the illuminant.

5. The backlit finger feature recognition structure of claim 3, wherein the light guide member is constituted by a plurality of detachable plate bodies.

6. The backlit finger feature recognition structure of claim 1, wherein the light guide member comprises a first plate body and a second plate body respectively located under and above the circuit board assembly; the first plate body and the second plate body respectively have a first opening and a second opening; the first opening allows a portion of the circuit board assembly to extend therethrough to outside of the light guide member; the feature sensor and the illuminant are accommodated in the second opening.

7. The backlit finger feature recognition structure of claim 6, wherein the first plate body and the second plate body constitute the light guide member of an integral structure or a detachable structure.

8. The backlit finger feature recognition structure of claim 1, further comprising an additional illuminant electrically connected to the circuit board assembly, wherein the additional illuminant and the illuminant are located at a same surface or different surfaces of the circuit board assembly.

9. The backlit finger feature recognition structure of claim 1, wherein the circuit board assembly is a flex-rigid composite circuit board including a flexible printed circuit board and at least one rigid circuit board; the feature sensor and the illuminant are disposed on and electrically connected to the at least one rigid circuit board.

10. The backlit finger feature recognition structure of claim 1, further comprising a base holder with an accommodation space and a slot; the accommodation space is configured to accommodate the feature sensor, the light guide member, the circuit board assembly, and the illuminant; the slot communicates with the accommodation space and allows the circuit board assembly to extend from the slot to outside of the base holder.

11. The backlit finger feature recognition structure of claim 10, further comprising a cover disposed on the base holder to cover the accommodation space; the cover has a light-permeable portion; in a light-output direction, the light guide member at least partially overlaps the light-permeable portion.

12. The backlit finger feature recognition structure of claim 1, further comprising an optical film disposed on a light-exit surface of the light guide member.

13. The backlit finger feature recognition structure of claim 1, further comprising a plurality of light-exit dots disposed at a side of the light guide member opposite to a light-exit surface of the light guide member.

14. The backlit finger feature recognition structure of claim 1, wherein the illuminant is at least partially located in a region defined by extending lines of adjacent outmost sides of the feature sensor.

15. A backlit finger feature recognition structure, comprising:

a feature sensor configured to sense a finger feature;

a light guide member disposed surrounding the feature sensor;

a circuit board assembly disposed corresponding to the light guide member and electrically connected to a lower side of the feature sensor; and an illuminant electrically connected to the circuit board assembly, wherein in a plane view, the illuminant is located between the light guide member and the feature sensor, and the light guide member guides light emitted from the illuminant to be emitted upward;

wherein the feature sensor has a non-quadrilateral cut shape to form a retreat space between the light guide member and the feature sensor, and the illuminant is located in the retreat space.

16. The backlit finger feature recognition structure of claim 15, wherein the illuminant is at least partially located in a region defined by extending lines of adjacent outmost sides of the feature sensor.

17. The backlit finger feature recognition structure of claim 15, wherein the illuminant and the feature sensor are located at a same side of the circuit board assembly.

18. The backlit finger feature recognition structure of claim 15, wherein the light guide member comprises a plate body with an opening; the plate body is disposed on the circuit board assembly; the feature sensor and the illuminant are accommodated in the opening.

19. The backlit finger feature recognition structure of claim 18, wherein the light guide member is constituted by a plurality of detachable plate bodies.

20. A backlit finger feature recognition structure, comprising:

a feature sensor configured to sense a finger feature;

a light guide member disposed surrounding the feature sensor;

a circuit board assembly disposed corresponding to the light guide member and electrically connected to a lower side of the feature sensor; and an illuminant electrically connected to the circuit board assembly, wherein in a stacking direction, the illuminant does not overlap the feature sensor, and the light guide member guides light emitted from the illuminant to be emitted along the stacking direction;

wherein the light guide member comprises a first plate body and a second plate body respectively located under and above the circuit board assembly; the first plate body and the second plate body respectively have a first opening and a second opening; the first opening allows a portion of the circuit board assembly to extend therethrough to outside of the light guide member; the feature sensor and the illuminant are accommodated in the second opening.

\* \* \* \* \*